(12) United States Patent  
Bohn et al.

(10) Patent No.: US 8,387,858 B2
(45) Date of Patent: Mar. 5, 2013

(54) CONSUMER REWARDS SYSTEMS AND METHODS

(75) Inventors: William Robert Bohn, Gainesville, VA (US); Robert William Bohn, Gainesville, VA (US); Nima Ostad, Centennial, CO (US); Cameron Lichtenstein, Napa, CA (US)

(73) Assignee: Synderesis Technologies, Inc., Gainesville, VA (US)

( * ) Notice: Subject to any disclaimer, the term of this patent is extended or adjusted under 35 U.S.C. 154(b) by 52 days.

(21) Appl. No.: 12/782,504

(22) Filed: May 18, 2010

(65) Prior Publication Data

US 2010/0301113 A1    Dec. 2, 2010

Related U.S. Application Data

(60) Provisional application No. 61/182,876, filed on Jun. 1, 2009.

(51) Int. Cl.
*G06F 17/00* (2006.01)

(52) U.S. Cl. .................................. 235/375; 235/380

(58) Field of Classification Search .................. 235/375, 235/380, 487
See application file for complete search history.

(56) References Cited

U.S. PATENT DOCUMENTS

| | | | |
|---|---|---|---|
| 6,434,559 B1 * | 8/2002 | Lundberg et al. ..................... 1/1 |
| 6,788,946 B2 * | 9/2004 | Winchell et al. ............... 455/459 |
| 6,907,400 B1 * | 6/2005 | Matsko et al. ............. 705/14.12 |
| 7,162,540 B2 * | 1/2007 | Jasen et al. ..................... 709/242 |
| 7,372,871 B2 * | 5/2008 | Grecco et al. ................. 370/477 |
| 7,460,558 B2 * | 12/2008 | Anand ........................... 370/468 |
| 7,533,181 B2 * | 5/2009 | Dawson et al. ............... 709/229 |
| 7,624,040 B2 * | 11/2009 | Postrel ......................... 705/14.26 |
| 7,624,041 B2 * | 11/2009 | Postrel ......................... 705/14.26 |
| 7,676,393 B2 * | 3/2010 | Postrel ........................... 705/14.3 |
| 7,680,687 B2 * | 3/2010 | Postrel ........................... 705/14.3 |
| 7,734,807 B2 * | 6/2010 | Shuster ......................... 709/232 |
| 7,761,542 B2 * | 7/2010 | Nakamura et al. ............ 709/223 |
| 7,769,630 B2 * | 8/2010 | Postrel ......................... 705/14.28 |
| 7,788,366 B2 * | 8/2010 | Yacoby et al. ................ 709/224 |
| 2002/0019879 A1 * | 2/2002 | Jasen et al. .................... 709/240 |
| 2002/0091825 A1 * | 7/2002 | Shuster ......................... 709/226 |
| 2002/0143614 A1 * | 10/2002 | MacLean et al. ............... 705/14 |
| 2002/0151321 A1 * | 10/2002 | Winchell et al. .............. 455/519 |
| 2004/0054581 A1 * | 3/2004 | Redford et al. ................. 705/14 |
| 2004/0249710 A1 * | 12/2004 | Smith et al. .................... 705/14 |
| 2005/0021399 A1 * | 1/2005 | Postrel ............................ 705/14 |
| 2006/0224454 A1 * | 10/2006 | Kantor et al. ................... 705/14 |
| 2007/0038515 A1 * | 2/2007 | Postrel ............................ 705/14 |
| 2009/0037275 A1 * | 2/2009 | Pollio ............................. 705/14 |

* cited by examiner

*Primary Examiner* — Daniel Hess
*Assistant Examiner* — Paultep Savusdiphol
(74) *Attorney, Agent, or Firm* — Peter Jon Gluck; Baker Hostetler; Shambler Media Corp.

(57) ABSTRACT

A method comprising, in combination: receiving a unique identifier from a consumer; receiving a list of at least one item to be purchased corresponding to a pending transaction; identifying a consumer account associated with the unique identifier; applying at least one accrued point of the consumer account to determine a redemption possibility; and providing a redemption possibility to the consumer. A system comprising, in combination: a point-of-sale (POS) device, further comprising a reader configured to receive a unique identifier and a display configured for providing information to at least one of a merchant and a consumer; an account management system, further comprising an account database containing information regarding at least one consumer account; wherein the POS device and the account management system are communicatively connected to transmit at least one of a unique identifier and a redemption possibility.

19 Claims, 10 Drawing Sheets

US 8,387,858 B2

CONSUMER REWARDS SYSTEMS AND METHODS

RELATED APPLICATIONS

This application claims the Paris Convention Priority of U.S. Provisional Patent Application Ser. No. 61/182,876, filed on Jun. 1, 2009 and entitled "Consumer Rewards Systems and Methods," the contents of which are incorporated in this application.

BACKGROUND

This disclosure relates to membership in rewards and incentives programs for merchants and consumers, as well as systems and methods for facilitating interactions between merchants and consumers.

SUMMARY

The service disclosed herein allows consumers a single place to manage all of their merchant reward card and loyalty programs accounts. Through the use of unique identification via phone number, e-mail address, program-specific identification number, or near field communication devices, merchants can keep track of their consumer base and implement reward card or loyalty programs with ease. The system allows merchants to target their consumers via a web interface and keep them up to date with service specials, promotions, and progress toward rewards. The system also provides tailored reports to merchants on their consumer base, coupled with spending trend data reporting available through unique consumer identification. The system targets the ripe retail merchant and consumer bases for widespread usage and compatibility with other consumer identity-based programs, such as subway and train fare, vending machines, and various other retail outlets.

According to aspects of this disclosure, a method is disclosed comprising receiving from a merchant via a point of a sale (POS) capture device a total transaction data set for a transaction, receiving a consumer's unique identifier and a merchant identifier from the POS capture device as part of a total transaction data set, and adjusting a points balance for the merchant in the consumer's account hosted on the remote server based on the transaction data. The consumer's account aggregates points for a plurality of disparate merchants, the points balance for at least one merchant being exclusive from the points balance of at least one other merchant.

According to aspects of this disclosure, a system is disclosed comprising, in combination, a point-of-sale capture device comprising at least (1) a unique identifier reader configured to receive a unique identifier, (2) a display configured for providing information to at least one of a merchant and a consumer, and (3) a POS computer; and a remote server comprising a database containing information regarding at least one consumer account and transaction data for a plurality of transactions, a server for facilitating communication between the POS capture device and the remote server. The remote server comprises a plurality of consumer accounts, wherein at least one consumer account comprises a points balance for a plurality of disparate merchants, the points balance for at least one merchant being exclusive from the points balance of at least one other merchant.

According to aspects of this disclosure, a machine-readable medium containing instructions stored thereon for, with a remote server receiving from a merchant via a point of sale (POS) capture device a total transaction data set for a transaction, receiving a consumer's unique identifier and a merchant identifier from the POS capture device as part of a total transaction data set, and adjusting a points balance for the merchant in the consumer's account hosted on the remote server based on the transaction data. The consumer's account aggregates points for a plurality of disparate merchants, the points balance for at least one merchant being exclusive from the points balance of at least one other merchant.

DRAWINGS

The above-mentioned features and objects of the present disclosure will become more apparent with reference to the following description taken in conjunction with the accompanying drawings wherein like reference numerals denote like elements and in which.

Figure 9:
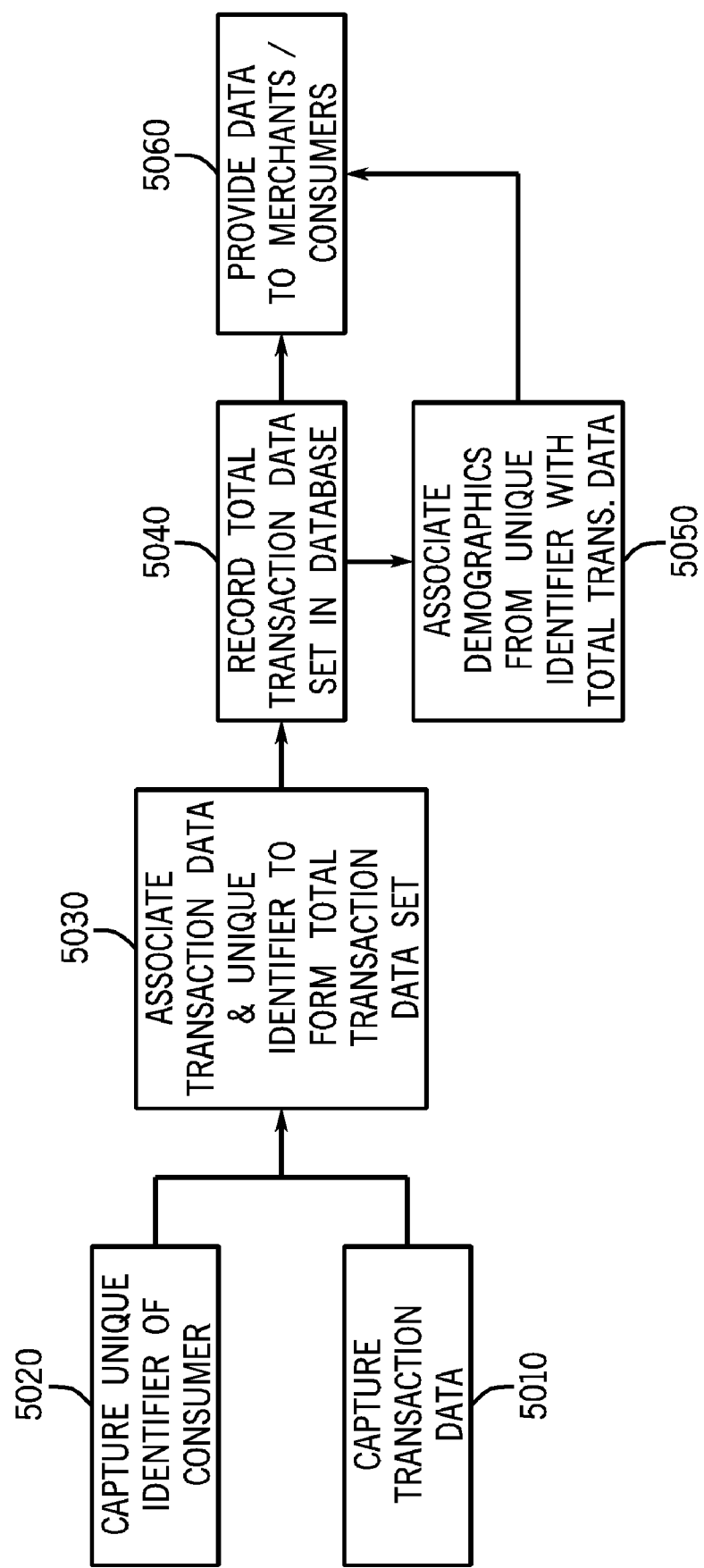
Figure 10:
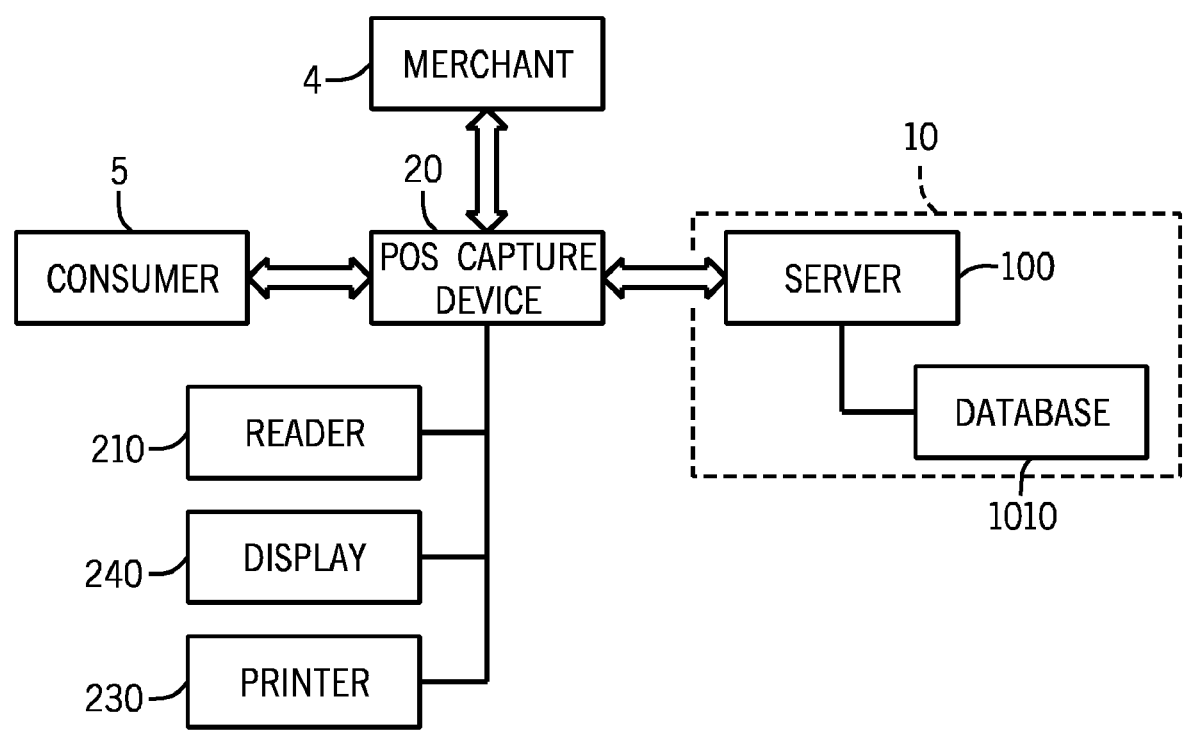

FIG. 9 is a flow diagram of an embodiment of a method of capturing transaction data and associating the captured transaction data with the unique identifier of a consumer and collecting the associated data; and FIG. 10 is a schematic diagram view of an embodiment of a system configured to facilitate an interaction between a consumer, a merchant, a point of sale device, and an account management system.

DETAILED DESCRIPTION

In the following detailed description of embodiments of the present disclosure, reference is made to the accompanying drawings in which like references indicate similar elements, and in which is shown by way of illustration specific embodiments in which the present disclosure may be practiced. These embodiments are described in sufficient detail to enable those skilled in the art to practice the present disclosure, and it is to be understood that other embodiments may be utilized and that logical, mechanical, electrical, functional, and other changes may be made without departing from the scope of the present disclosure. The following detailed description is, therefore, not to be taken in a limiting sense, and the scope of the present disclosure is defined only by the appended claims. As used in the present disclosure, the term "or" shall be understood to be defined as a logical disjunction and shall not indicate an exclusive disjunction unless expressly indicated as such or notated as "xor."

As used herein, the term "demographic" shall mean a statistic of an entity, including persons and business entities, related to vital statistics, physical locations, geography, population size, population density, and other data that is useful for analyzing behavior related to transactions.

As used herein, the term "transaction" shall mean the exchange of a good or service between at least one entity providing the good or service and another entity in exchange for remuneration from the other entity or a third entity. The term "transaction" expressly encompasses as individual "transactions" incremental steps in a complete transaction. For example, a consumer may purchase a meal at a hotel and charging it back to a room; thus, at the time the meal transaction is complete, no remuneration for the meal is provided, although a merchant may wish to capture transaction data for the meal as part of an incremental part of the larger transaction (i.e., settling the entire hotel bill). The term transaction shall also expressly contemplate third parties providing the remuneration for the consumer.

As used herein, the term "consumer" shall mean an entity providing remuneration to a merchant for a good or service.

As used herein, the term "merchant" shall mean an entity providing a good or service to a consumer for remuneration. Merchants encompass entities providing the good at the point of sale, distributors of the good or service, merchants of the good or service, or manufacturers of the good or service.

As used herein, the term "point of sale" or "POS" shall mean the physical or internet location where a transaction is captured or conducted. With respect to an internet location, the POS shall be considered as the website on which the transaction occurs.

As used herein, the term "entity" shall mean a person or, a business, or other unit or organization capable of entering into a transaction.

As used herein, the term "point" shall mean a credit for reward(s) offered by merchants. Accordingly, points comprise airline miles, to grocery store points, unit purchase credits (e.g., buy 10 of product X and get the next X free), etc.

As used herein, the term "reward" shall mean a good, service, incentive, or discount provided in exchange for the redemption of points or use of the points and data capture system.

The inventors developed a points management and data capture system. The system relates to membership rewards programs, as well as new mediums and opportunities for merchants to effectively offer targeted advertising and promotions to specific consumer bases based on demographic information related to consumers and the products they purchase.

Accordingly, the inventors invented devices, systems, and methods for the management of point accounts via the capture of transaction data and the association of the transaction data with consumer demographics data in the transaction. According to embodiments, at the point of sale (POS), both transaction data and a unique identifier associated with the consumer are captured (collected). This information is associated together and stored in a database. The database system maintains this data for later analysis or use.

Additionally, for the transaction, points may be awarded by meeting certain criteria determined by the merchant. The points accrued are collected in the consumer's account that is hosted on a remote server having a database, according to embodiments. Similarly, rewards may be offered to the consumer at the point of sale if enough points have been accrued. The system maintains all of the merchant point accounts for each consumer, providing centralized management of points accounts, and consolidating multiple points memberships accounts with different merchants into a single card or identifier that is used for every merchant visited by the consumer.

According to embodiments, a points and data capture system comprises a point of sale capture device and a remote server that houses a server and a database for storing captured total transaction data, maintaining merchant and consumer accounts, and crediting points and managing rewards. Internet connected computer terminals for logging into and review account details are considered to be an optional part of the points and data capture system, according to some embodiments, although under the control of the merchant or consumer respectively.

Consumer Points Account Structure

Figure 1:
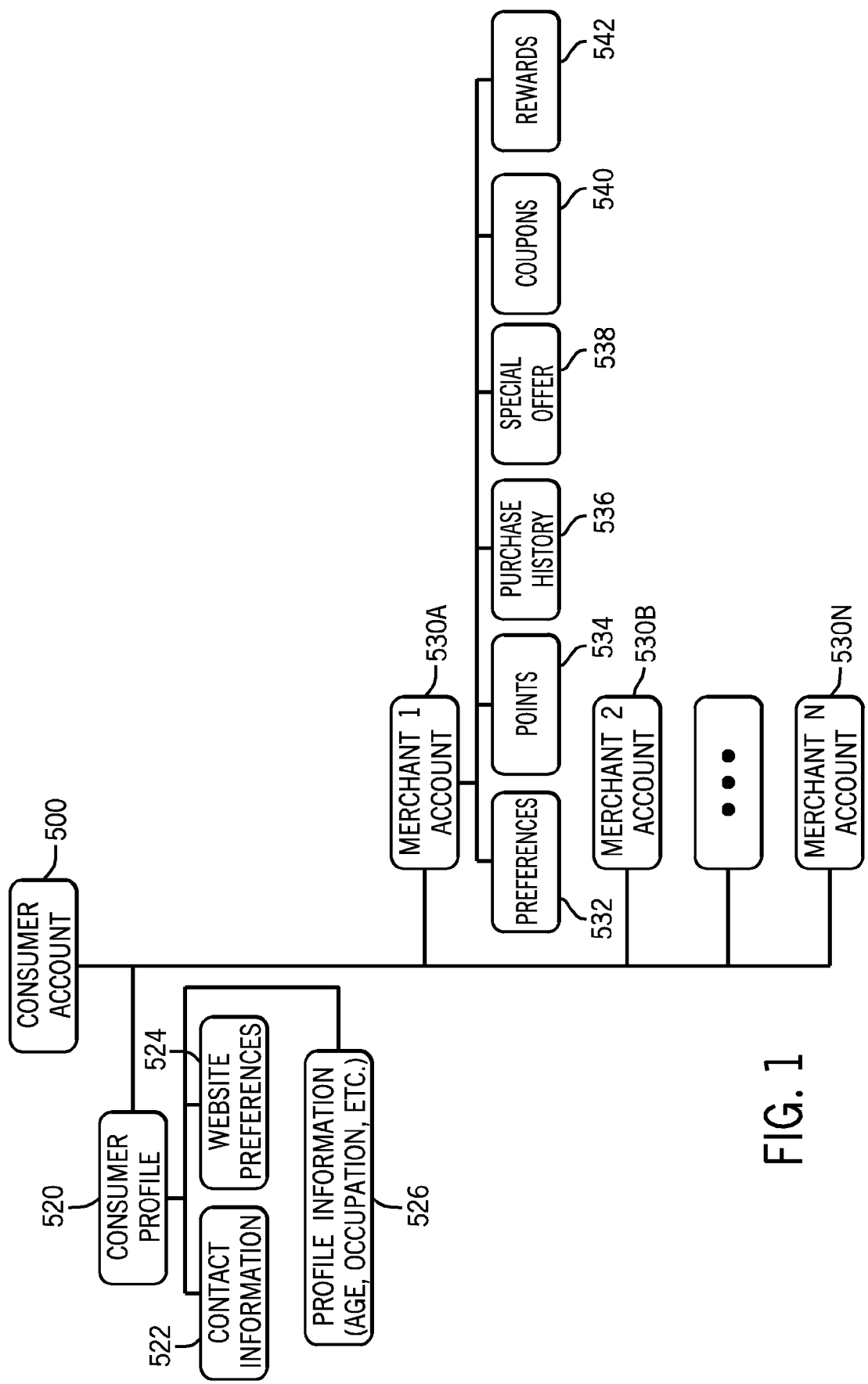
FIG. 1 is a schematic diagram view of an embodiment of information stored in a consumer account.
Figure 7:
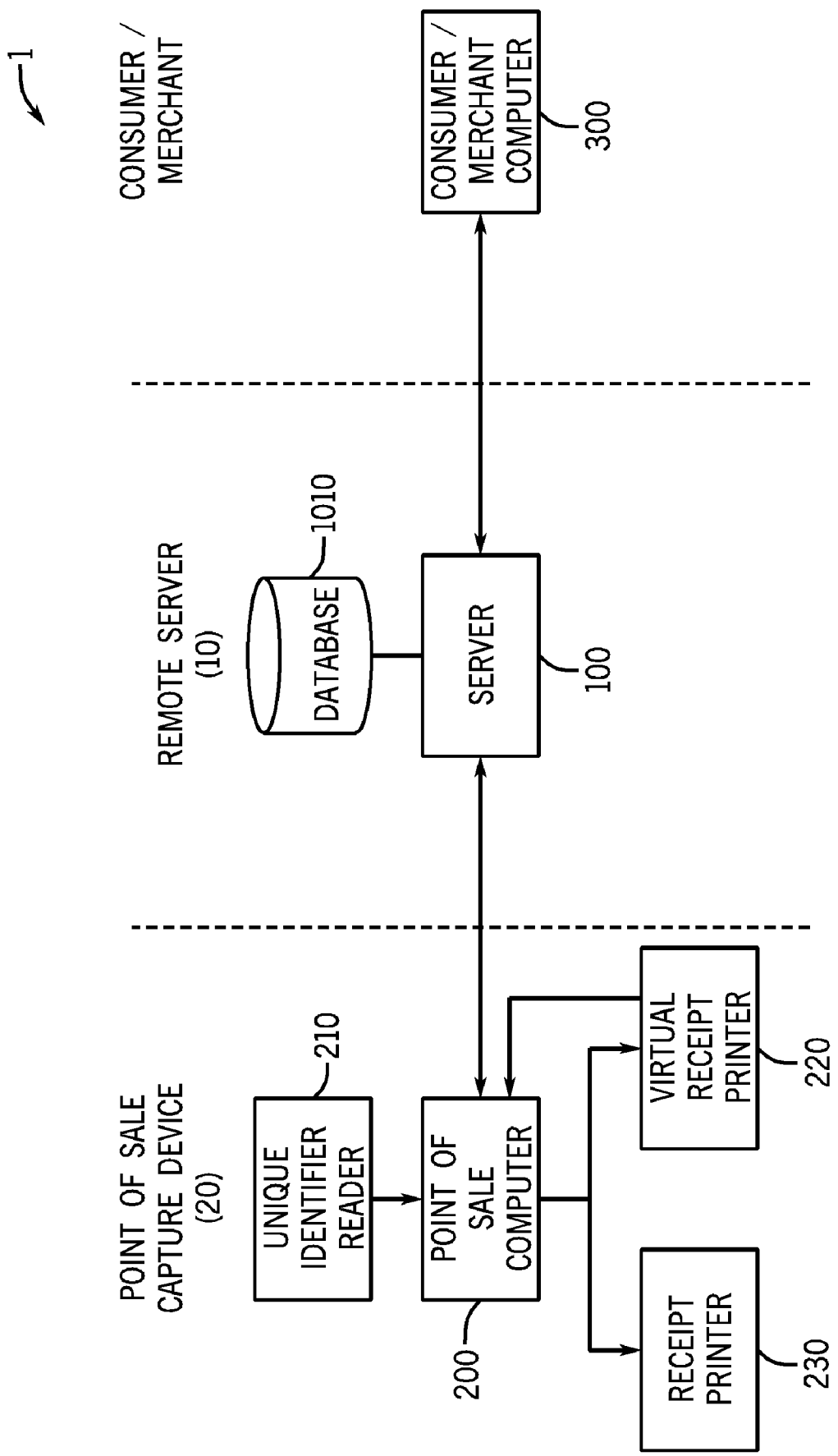
FIG. 7 is a block diagram of an embodiment of the devices used in a transaction data capture device and system.

According to embodiments and as illustrated in FIG. 1, consumer account 500 is stored, managed, and tracked in database 1010 hosted on server 100 (see FIG. 7). As illustrated in FIG. 1, consumer account 500 comprises consumer profile 520. Consumer profile 520 comprises demographic and account settings information provided by the consumer about himself or herself. For example, consumer profile includes the consumer's contact information 522, website preferences 524, and other demographic information 526, including, for example: age, occupation, children, or other information relating to the identity, hobbies, interests, etc. of the consumer As further illustrated according to the exemplary embodiment illustrated in FIG. 1, consumer account 500 further comprises information relating to at least one merchant account 530A, 530B, 530N. For example, the number of points 534 accrued by the consumer for a given merchant is stored in consumer account 500, according to embodiments. Moreover, for each merchant account, merchant account specific preferences 532 are selected by the consumer with respect to the given merchant. For example, some airlines permit a consumer to request which airline in a consortium of airline the user wants to accrue points. In such a case, the consumer would select the airline rewards program in which to accrue points in merchant specific preference 532. According to embodiments, and as shown in FIG. 1, information with respect to any number (N) of merchants may be associated with consumer account 500. Other merchant-based preferences include whether a merchant or third-parties affiliated with the merchant are permitted to contact the consumer, merchant-specific display preferences, or reward preferences, according to embodiments.

According to embodiments and as illustrated in FIG. 1, for each merchant account, purchase history 536 is available to the consumer for that merchant. Likewise, the consumer can access special offers 538, coupons 540 via consumer account 500. Consumer can also set preferences or redeem rewards 542, as well.

Figure 2:
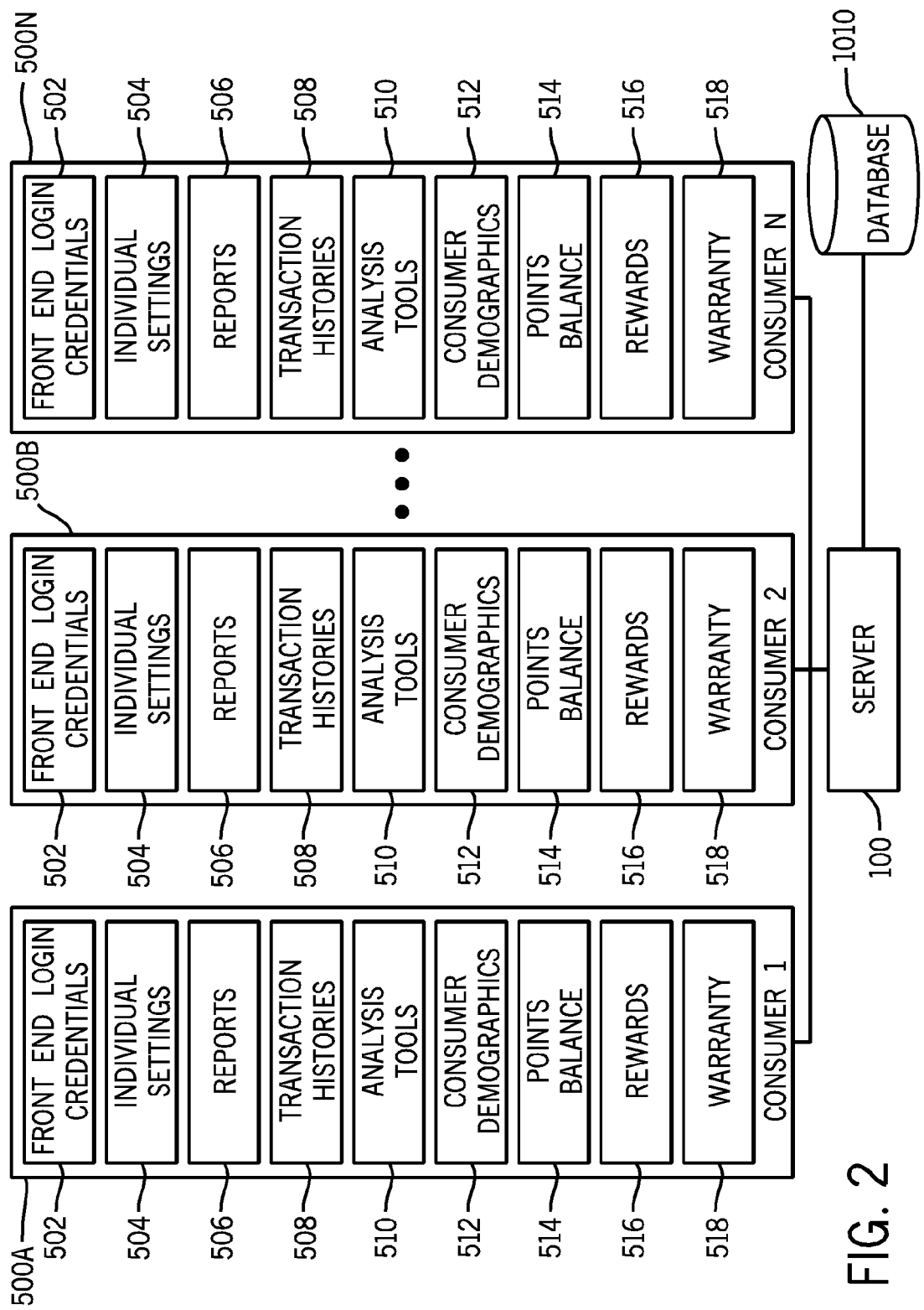
FIG. 2 is an information sharing diagram of an embodiment of exemplary functions available to a consumer experiencing captured total transaction data.

According to embodiments and as illustrated in FIG. 2, a consumer's account with points and data capture system 1. A plurality of consumer accounts 500A, 500B, 500N are shown. Each consumer account 500A, 500B, 500N is implemented on server 100, according to embodiments, and comprises a plurality of modules that allow the consumer to perform tasks. Front-end login credential module 502 provides the consumer with a portal to securely log into and out of the account, as well as change login passwords. Individual settings module 504 gives the consumer the ability to set individual settings, for example default screen, output resolution, number of search results in a list, etc. Such settings are well known and understood by artisans.

According to embodiments, reports module 506 allows the consumer to create and run various reports related to total transaction data contained in database 1010, for example. For example, reports module 506 would give the consumer access to reports about their spending history, behaviors, and categories of purchase's inter alia. Transaction histories module 508 allows the consumer to review transaction histories based on criteria such as date, store, merchant, etc. For example, transaction histories module 508 would give the consumer access to all transactions completed with all merchants or for a given merchant, over a given time period, in a category of purchases, etc. According to embodiments, each of these modules 506, 508 are condensed into a single database search module. However, for the purposes of illustration of the types of data that would be available in an exemplary consumer account 500A, 500B, 500N of points and data capture system 1, they are presented herein as individual modules. Other modules are likewise expressly contemplated depending on the specific transaction data captured per each implementation of points and data capture system 1.

According to embodiments, each consumer account 500A, 500B, 500N comprises analysis tools module 510. Analysis tools module 510 provides tools for analyzing various data. For example, analysis tools module 510 allows the consumer to look at spending trends, purchase savings, and could help the consumer budget, make grocery lists, manage warranties or rebates, and many other functions.

Each consumer account 500A, 500B, 500N also includes a consumer demographics module 512 that solicits the consumer's demographics. For example, demographics module 512 causes the consumer to input an address, a birthday, family size, income, vocation, hobbies/interests or other personal data related to the consumer and the consumer's interests. According to embodiments, these data are stored in database 1010 and can be concatenated with each total transaction data set to augment the data generated at the POS and give merchants and consumers more powerful data analysis tools. According to embodiments, consumer demographics also includes a picture of the consumer to be attached. The picture can be used to disambiguate the consumer during the capture process, as described below, or is used to verify the account on the part of the merchant. Accordingly, the picture would be shown to the merchant at the time of the transaction, thereby allowing the merchant to verify the identity of or disambiguate the consumer.

According to embodiments, each consumer account 500A, 500B, 500N comprise points balance module 514, rewards module 516, or warranty module 518. According to embodiments, points balance module 514 is a module that allows the consumer to review points earned on a per merchant basis. For example, the consumer may want to see the number of points earned from purchases with ACME and ABC company. Using point module 514, consumer could review the points balance for his purchases with each of these merchants, respectively.

According to embodiments, rewards module 516 allows the consumer to redeem points for rewards, or in some cases print rewards coupons, etc. According to embodiments, rewards module 516 allows the consumer to electronically apply coupons to the account such that the coupons are redeemed when the customer is identified with the merchant. Using rewards module lets the consumer review progress towards rewards, select rewards, redeem points for rewards, or claim rewards that can be printed/ordered from the consumer's computer. According to embodiments, rewards/promotions may be pushed to the consumer from a merchant via rewards module. For example, a merchant will notify consumer of a buy one, get one free promotion at their store and allow the consumer to print a "buy one, get one free" coupon to take advantage of the promotion. According to still other embodiments, rewards are offered by the merchant at the point of sale if sufficient points for a reward have been accrued. Accordingly, all rewards can be handled by POS capture device 20 (i.e., electronically), whereby the rewards, discounts, coupons, etc. are offered to the merchant or consumer via POS capture device 20 (or via cell phone, or other devices in data communication with points and data capture system 1) at the point of sale.

Likewise, consumer account, according to embodiments, provides a central source for the management for the warranties of products purchased by a consumer. According to embodiments, when a consumer purchases a product or service having a warranty, a serial number for the product/service or another identifier that uniquely identifies the good/service is recorded with database 1010 of points and data capture system 1. According to still other embodiments, these products/services, where applicable, will automatically be registered with the source of the warranty for the good/service, thereby giving the consumer an added layer of protection in the event of defects with the product or the service provided. Use of warranty module 518 lets the consumer review whether the warranty is still in force. According to some embodiments, warranty module 518 will allow the consumer to make warranty claims, or provide connection to the warranty service provider. According to some embodiments, points and data capture system 1 offers to consumer extended warranties for certain goods/services.

Consumer Account Creation Process

According to embodiments, consumer accounts 500A, 500B, 500N are created by consumer via a personal computer. Account creation in this way is accomplished by a typical registration process with a computer connected to server 100. According to embodiments, creates a username and password, inputs demographic information, inputs unique identifiers (e.g., driver's license number, email address, cellular telephone numbers, etc.) and inputs information about points accounts with merchant's, if known. According to embodiments, where an RFID tag system is used as described below, each consumer is mailed a card having an RFID tag or a keychain FOB with an RFID tag embedded therein.

According to other embodiments, a merchant may facilitate a beginning of a creation of a new consumer account 500A, 500B, 500N. As part of the transaction process, merchants subscribed with a points service may ask their consumers if they already have an account. If a consumer does not have an account, the consumer may be asked for contact information, such as a phone number or an e-mail address to be contacted. The merchant may also request one or more unique identifier to include in the account creation process. Using this information, the merchant creates a new consumer account with points and data capture system 1 and enters the contact information into the system with the current points balance of the transaction. A text-message, phone call, or e-mail may be sent to the consumer with an activation code and instructions on how to validate the account. For example, a temporary user name or password may be provided for the consumer to activate a new account or create a final account from a temporary account. Upon activating the new consumer account, the consumer may change login details, as well as provide demographic information, such as gender, birth date, and other information, as well as other unique identifiers for storage with points and database capture system 1.

According to embodiments, where a merchant creates consumer account 500A, 500B, 500N, a temporary account is created until the consumer finalizes the account, for example, by providing additional personal information. The temporary account accrues points or has other parameters automatically set based on default settings until final account 500A, 500B, 500N is created. At the time final account 500A, 500B, 500N is created, parameters of the temporary account, such as points accrued, may be transferred to the final account. According to embodiments, the use of a temporary account is effective for providing benefits to at least one of the consumer and the merchant until a final account is created or creating efficiencies where the consumer opts not to create the final account.

According to embodiments, a merchant may facilitate the creation of new consumer account 500A, 500B, 500N with minimal consumer intervention. As a merchant is facilitating the creation of new consumer account 500A, 500B, 500N, the consumer may provide a piece of personal information that may also act as a unique identifier, such as any of the unique identifiers disclosed herein. For example, an e-mail address, cellular telephone number, or name is provided by the consumer and used as the unique identifier associated with the consumer account created by the merchant. Thereafter, when the consumer creates a separate account and enters the unique identifier, the unique identifier will cause the points balance for the merchant who created the account to transfer to the consumer's account newly created account.

Accounts

Figure 3:
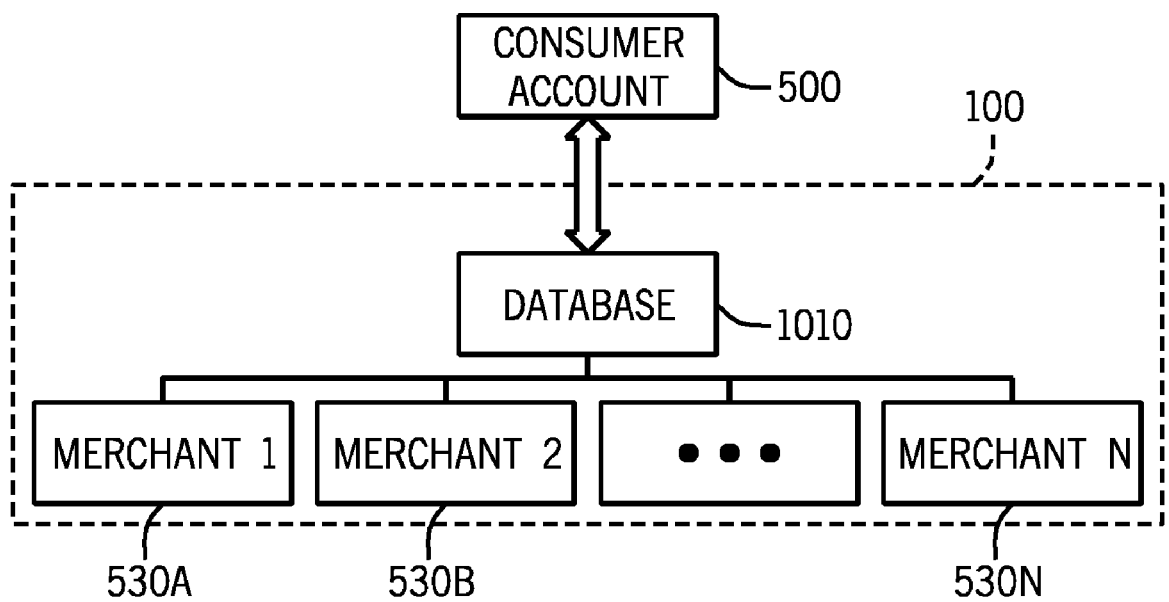
FIG. 3 is a schematic diagram view of an embodiment of a system configured to facilitate a consumer's access to a database containing merchant information.

According to embodiments, a consumer may access points and data capture system 1 directly via server 100 to view, retrieve, and manage information contained in database 1010 regarding merchants with which the consumer is associated through a points program, as illustrated in FIG. 3. As illustrated in FIG. 3, consumer is able to access the points balance for each merchant 530A, 530B, 530N with whom the consumer has a points account. According to embodiments, consumers view their progress toward their rewards as well as manage their communication with merchants via the interface with each merchant in each consumer account 500.

Figure 4:
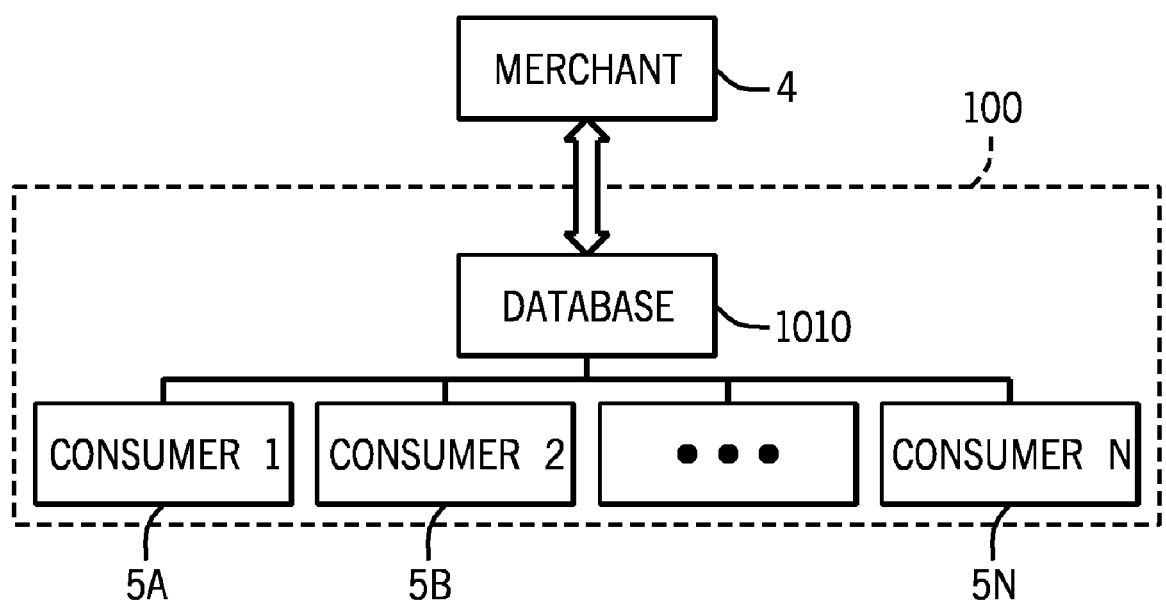
FIG. 4 is a schematic diagram view of an embodiment of a system configured to facilitate a merchant's access to a database containing consumer information.

According to embodiments and as illustrated in FIG. 4, a merchant accesses points and data capture system 1 via server 100 to view, retrieve, and manage information regarding consumers with which the merchant is associated through a points program, as well as to view, retrieve, and manage other transaction statistics and analysis. According to embodiments, merchants are provided with a framework from which they can track statistics regarding transactions with consumers. Furthermore, merchants are able to manage their presence within the system via a communications interface such as the internet. According to embodiments, merchants also manage settings related to the accrual of features to consumer accounts based on transactions between consumers and the merchant. For example, a merchant may determine how points are accrued by consumers participating in the points program (e.g., X number of points per Y amount spent; X number of points per Y number of qualifying items purchased, etc.).

Figure 5:
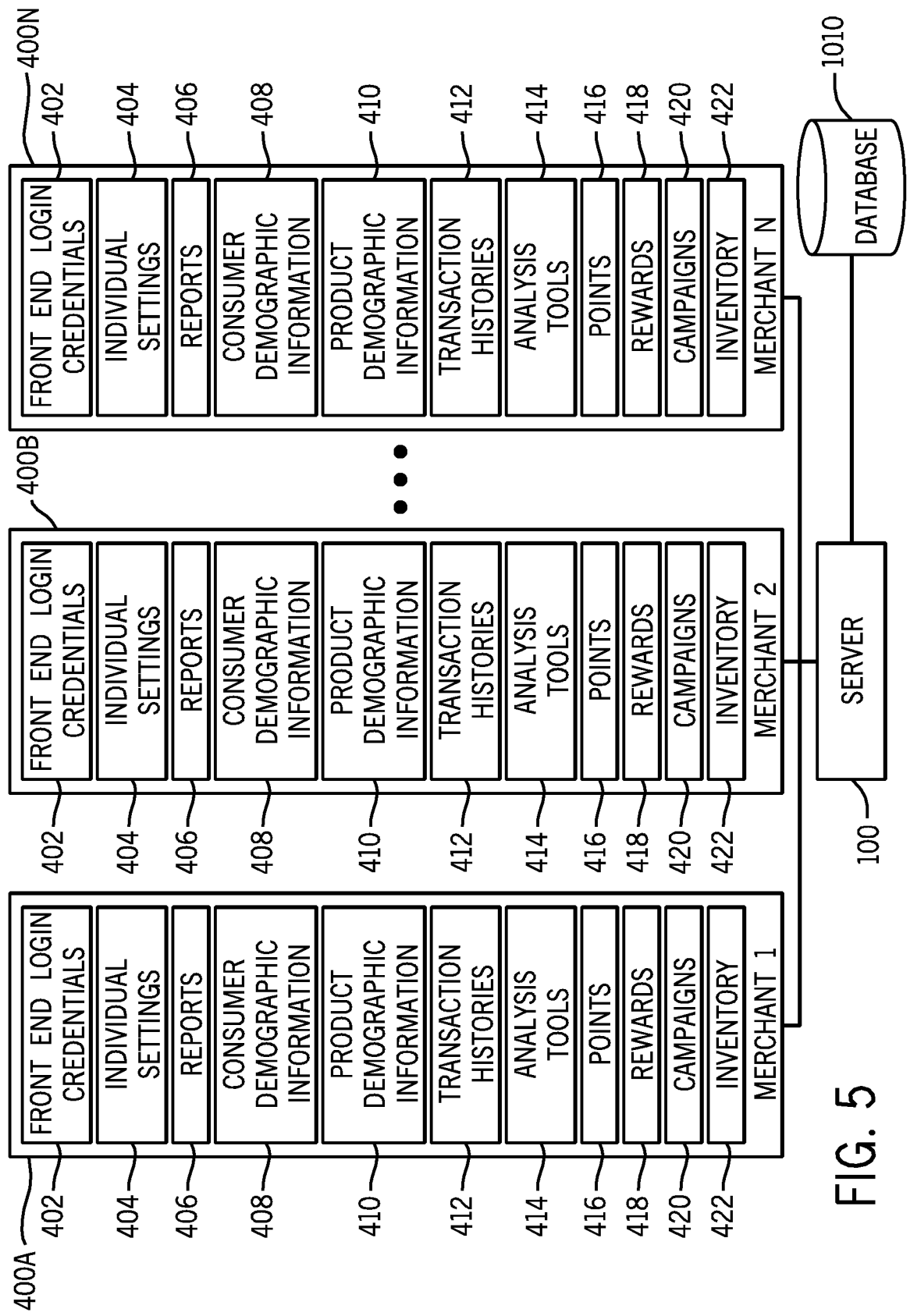
FIG. 5 is an information sharing diagram of an embodiment of exemplary functions available to a merchant experiencing captured total transaction data.

According to embodiments, as illustrated according to embodiments in FIG. 5, merchant accounts 400A, 400B, 400N with points and data capture system 1 are shown. According to embodiments, each merchant account is private from other merchant's accounts. Each merchant account is hosted on server 100, via merchant account 400A, 400B, 400N, a merchant is able to access data contained in database 1010. Using internet connected computer 300 (FIG. 7), merchants are able to view data related to individual transactions, view demographics related statistics, etc. For example, a merchant may want to know what age group is buying a given product, or the merchant may wish to know whether more men or more women shop at his store. These data can be used in various ways by the merchant: to promote products, to evaluate and select advertising channels, to product placement on the floor of brick-and-mortar stores.

According to embodiments and as illustrated in FIG. 5, each merchant account comprises a plurality of modules. Each module is tailored to perform one or more specific functions. Front-end login credential module 402 provides merchant with a portal to securely log into and out of the account, as well as change login passwords. Individual settings module 404 gives the merchant the ability to set individual settings, for example default screen resolution, number of search results in a list, etc. Such settings are well known and understood by artisans.

According to embodiments, reports module 406 allows the merchant to create and run various reports related to total transaction data contained in database 1010, for example. Consumer demographic information module 408 allows merchant to create and run various queries related to the demographics of consumers with whom merchant entered transactions. Similarly, product demographic information module 410 allows the merchant to create and run various queries related to the sales of particular goods or services, and evaluate the demographics of those who are buying or not buying those goods or services. Transaction histories module 412 allows the merchant to review transaction histories based on criteria such as date, store, consumer, etc. Each of modules 406, 408, 410, 412 are database query modules that allow the merchant to review and evaluate transaction data based on a given criteria. According to embodiments, each of these modules 406, 408, 410, 412 are condensed into a single database search module. However, for the purposes of illustration of the types of data that would be available in an exemplary merchant account of points and data capture system 1, they are presented herein as individual modules. Other modules are likewise expressly contemplated depending on the specific transaction data captured per each implementation of points and data capture system 1.

Finally, each merchant account comprises analysis tools module 414, according to embodiments. Analysis tools module 414 provides tools for analyzing various data. For example, analysis tools may look at the sales of a particular product and make a recommendation for an advertising channel depending on demographics. For example, analysis tools could look for golf products purchased by men aged 30-50 for an advertising spot in Golf Digest. According to another example, the same product could be advertised in different markets using different advertising campaigns. Analysis tools module could then be used to analyze which campaign was more effective on a per demographics basis.

According to embodiments, each merchant account further comprises tools related to points management, rewards management, and management of points campaigns. Although these functions are shown as individual modules in FIG. 5, it will be expressly understood that all or some of the functions can be combined into a single module. Points module 416 gives the merchant an interface to review points balances in aggregate or on a per consumer basis, per location basis, per geographical region basis, etc. Likewise, rewards module 418 gives the merchant the ability to review rewards (including, according to embodiments, progress towards rewards). Using rewards module 418, merchants can review total rewards owed, total rewards redeemed, progress towards awards, etc. on a per consumer basis, per location basis, per geographical area basis, etc.

Points campaign module 420 permits each merchant to create points campaigns. Each points campaign can defines the rules that govern the award of point and the criteria for qualifying for rewards. For example, a campaign will determine that the first 100 consumers to spend $25 at a given location will each be awarded 10 points. The campaign will further dictate that upon accruing 25 points, a consumer will qualify for a prize, for example a gift card. Many variations on this theme are possible, including points campaigns with unlimited point awards and an unlimited time limit (e.g., airline frequent flyer awards accounts), or campaign directed to a single good or service, or campaigns directed to a certain geographical region or merchant location.

According to embodiments, inventory module 422 permits merchants to manage their inventory. Inventory module 422, according to embodiments, permits the merchant to monitor and replace inventory, and to review trends with respect inventory. According to embodiments, inventory is input either manually or via an application programming interface that is configured to receive inventory data. Inventory data can be passed down throughout the supply chain or for other purposes related to maintaining and managing inventories.

According to embodiments, each merchant's account is transparent to other merchants' accounts. Thus, a merchant cannot view transaction details or other statistics gathered by any other merchant. According to other embodiments, it is possible for merchants to exchange points between accounts. According to these embodiments, merchants are able to waive a degree or all of the transparency with other merchants and allow sharing or transfer of points. For example, many airlines allow points from other airlines to be used. Points and data capture system 1 would therefore allow for the transfer of points between allied airlines merchant's accounts; when the points are redeemed, the balance is likewise transmitted throughout all the merchant accounts for the airline.

According to embodiments, other merchants in the chain of a good or service, such as the manufacturer of a good will have an account with points and data capture system 1 and have POS total transaction data that concerns them automatically pushed to their accounts. Each manufacturer will place into commerce goods that are identified with an SKU, and as such will be able to aggregate data for all goods or services associated with the SKU and use that data for beneficial purposes specific to the manufacturer.

For example, when a given good is sold, the manufacturer of the good may automatically have data for the transaction associated with the manufacturer's account based on the SKU. Other data that might be pushed to the manufacturers account, according to embodiments, includes at least the name of the merchant, the identity of the consumer provided. According to other embodiments, the consumer's identity or demographic information could be held confidential unless the consumer expressly consents to have it shared with the merchant or requests automatic enrollment in a warranty program, for example. According to some embodiments, some data from the transaction is withheld from the manufacturer. For example, if a consumer purchases three goods manufactured by three different manufacturers, then each manufacturer would only have access to total transaction data as it relates to them—i.e., data related to sale of the goods produced by the other manufacturers would be transparent to the manufacturer such that as far as the manufacturer is concerned, only a single good was purchased by the consumer. With transaction data that is automatically pushed to the manufacturer, the manufacturer is able to make manufacturing forecasts, run reports, budget required stock and assess inventory in real time. Moreover, manufacturers can use transaction data to incentivize the merchant at the POS or adjust the suggested prices based on real time data regarding demand. A manufacturer-merchant account would closely resemble the merchant accounts described above, except would be tailored to providing data specific to the manufacturer. Generally, any entity can have an account provided they have a unique identifier (such as a consumer unique identifier or a merchant unique identifier, or they supply a good or service that can be uniquely identified).

Unique Identifiers

According to embodiments, each consumer is identified with a unique identifier that is unique to that consumer. A unique identifier comprises an alphanumeric string or other information that uniquely identifies a consumer. Examples of unique identifiers include social security numbers, credit card numbers, driver's license numbers, email addresses, etc. According to alternate embodiments, each consumer's unique identifier comprises an arbitrary number assigned to the consumer or selected by the consumer.

For example, each consumer is issued an account card or account FOB. According to embodiments, account cards or FOBs are RFID-enabled, such as with FeliCa, NFC, or comparable technology. An account card either actively or passively transmits the consumer's unique identifier. Usage of an account card may be coupled with a PIN or other security code that would enable access to the consumer while discouraging fraudulent or unauthorized use by anyone other than the consumer. Account cards may be magnetically-enabled, as with a magnetic strip, such that a magnetic reader is required to read the consumer identified, according to alternate embodiments.

Where the unique identifier comprises one or more of a phone number, e-mail address, name, date of birth, address, etc., these identifiers are provided to merchants via conventional input devices without specialized machinery or devices (e.g., specialized readers) to correlate a consumer with the consumer's transactions. According to embodiments, the unique identifier is a unique, arbitrary alphanumeric assigned to a consumer account.

According to embodiments, a unique identifier and mechanism for conveying the same are consolidated with other devices used to identify the consumer in other programs. For example, a unique identifier relating to a consumer account may be assigned based on another selected or pre-existing identifier, such as a bus pass, a train access card, a credit card, a student ID, etc.

Figure 6:
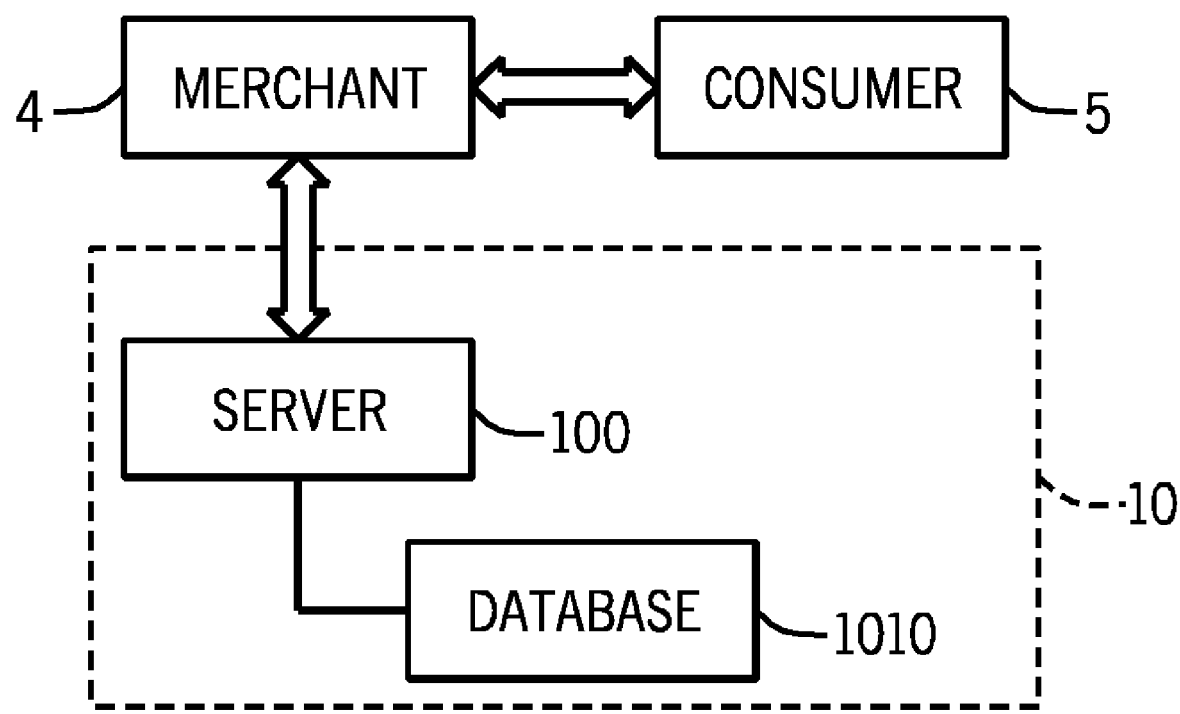
FIG. 6 is a schematic diagram view of an embodiment of a system configured to facilitate an interaction between a consumer, a merchant, and an account management system.

According to embodiments, during a transaction between a consumer and a merchant, the merchant accesses server 100 of remote service 10 to retrieve information from at least one of a consumer account and a merchant account from database 1010. According to an exemplary embodiment illustrated in FIG. 6, consumer 5 provides a unique identifier to merchant 4. Merchant 4 accesses database 1010 via server 100, providing at least one of the unique identifier and a merchant identifier. Server 100 retrieves information from database 1010 and provides merchant 4 with information corresponding to at least one of consumer 5 and merchant 4.

According to embodiments, during a transaction between consumer 5 and merchant 4, the transaction is modified based on the data returned from remote server 10. For example, points, rewards, or rebates accrued and recorded in the consumer's account are be applied to the transaction to modify the price, offer other incentives to the consumer, offer rewards, offer coupons, etc.

According to embodiments, during a transaction between consumer 5 and merchant 4, the consumer's account and the merchant's account are updated based on the transaction. According to embodiments, the merchant collects the total transaction data, for example as disclosed below, as well as the consumer's unique identifier. When the merchant transmits the transaction data, including the unique identifier, as part of the total transaction data, a merchant identifier is also transmitted, whereby points and data capture system 1 can correlate the transaction data with both the consumer and the merchant. Once the transaction data, merchant, and consumer are determined by points and data capture system 1, points are awarded based on rules defined by a points campaign. For example, points may be associated with the transaction, such that a consumer account is awarded points based on the transaction itself.

Points and Data Capture System

According to embodiments, at the point of sale (POS), both transaction data and at least one unique identifier associated with the consumer are captured (collected). Use of this data allows merchants. These data are associated together and stored in a database. The database maintains these data for later analysis or use.

According to embodiments, total transaction data captured from transactions is useful in a variety of ways including providing merchants with tools to evaluate advertising success, product placement, and demographic purchasing trends. Merchants also benefit by better inventory control, and better understanding of the demographics entering into transaction with them. For consumers, the data provided by the systems and methods disclosed herein include analysis of spending and budgeting, among other uses. Other uses of the systems and methods disclosed herein expressly include: tracking hospital patient and equipment movement, inventory management, tracking people/equipment movement through transit systems (trains, busses, cars on roads), Kanban production system management, supply chain management (SCM) tracking, event/building guest lists, hotel guest tab tracking, restaurant resource/supply management, bar resource/supply management, delivery service inventory/tracking (related to SCM), medicine inventory management for use in households, pharmacy supply control (especially to ensure the correct drugs are delivered in the proper dosages), household clothing inventory, veterinarian and animal shelter pet tracking, food/drink/consumables rationing system management systems, electronic data transmission permission management (control if a files/data/information should be transmitted based on identifier, or what data/information has been transmitted).

The inventors expressly contemplate that points and data capture system 1 of this disclosure is useful for the management of more than consumer's points accounts. Other utilities include entry into locations that require appropriate identification or invitation, secure boarding of airplanes and trains, etc. This disclosure is useful for any application that requires unique identification of a consumer in conjunction with other information, such as demographics (e.g., age requirements for clubs), tickets (plane/train tickets), and the like. Moreover, merchants can use points and data capture system 1 to manage inventory and ordering.

According to embodiments and as illustrated in FIG. 7, points and data capture system 1, with its related devices and modules, is disclosed. According to embodiments, points and data capture system 1 comprises two primary components: remote server 10 and point-of-sale capture device 20. According to embodiments, consumer/merchant computer 30 is considered part of points and data capture system 1, but is under the control of the consumer respectively.

As illustrated in FIG. 7, at each POS location, point of sale capture device 20 comprises one or more POS computers 200 that capture the transaction data and identify the consumer involved in each transaction. According to embodiments, POS computer 200 comprises a cash register capable of executing software necessary to collect transaction data and associate the collected transaction data with a consumer's captured unique identifier. According to other embodiments, POS computer 200 is a stand alone device used in conjunction with other sales equipment, for example analog cash registers, credit card readers, or cash boxes. According to this example, POS computer 200 could be a personal computer connected to server 100 via in the internet. According to other embodiments, POS computer 200 comprises a server and a collection of nodes connecting to the server, each node individually capturing transaction data and unique identifiers and conveying the data to the merchant's server (e.g., a plurality of cash registers at a grocery store, which connect to a server that supplies each cash register computer with prices, etc. for each bar code scanned). According to still other embodiments, POS computer 200 comprises the servers/computers of online merchants or intermediaries, for example, credit card company servers or the servers of other intermediaries, for example a dedicated total transaction data collection service.

According to embodiments, unique identifier reader 210 detects a consumer based on a unique identifier of that consumer. A unique identifier comprises an alphanumeric string or other information that uniquely identifies a consumer. Examples of unique identifiers include social security numbers, credit card numbers, driver's license numbers, email addresses, etc, or combinations thereof. According to alternate embodiments, each consumer's unique identifier comprises an arbitrary number assigned to the consumer or selected by the consumer. According to still other embodiments, unique identifier include biometrics (retina scans, biological samples, DNA scans, etc.), quick response (QR) codes, photographic recognition of shapes and colors of an object on a person or the person itself (appearance-based recognition), unique signal/pattern transmission of electromagnetic waves, unique sounds/vibrations both in pitch and pattern, scent recognition, images displayed on mobile electronic devices, unique codes stored electronically on small storage devices (e.g., an identifier encoded in an identifier file contained on a USB storage device), light refraction through unique substances, and combinations thereof. Artisans will readily recognize that many of these methods are encompassed by HID-type systems, wherein a unique identifier is read by a specialized reader (e.g., RFID tags and readers, QR codes, retinal scans and other biometric scans, etc.). According to embodiments, a verification personal identifier (PIN) can be used in conjunction with the unique identifier for added security. The PIN is entered into an input device connected to POS computer 200 according to embodiments.

According to embodiments, each consumer's unique identifier is transmitted from a human interface device (HID) device, such as an RFID reader and tag. According to embodiments, HID device is an RFID tag and RFID reader. Accordingly, each HID device comprises at least an HID tag having a chip or circuit that is able to store the unique identifier and cause transmission of the unique identifier when queried by HID reader via a radio frequency signal, and an antenna. According to embodiments, HID device can either be active or passive. For example, HID device comprises an HID tag disposed in a keychain fob according to embodiments, or embedded into a credit card sized card for storage in a wallet or in other locations according to other equally effective embodiments. Other examples include HID tags embedded in the microcircuits of mobile phones or other portable electronic devices. Generally, the HID tag must be disposed in a device that is carried on the person of the consumer, whereby unique identifier reader 210 can detect and read the unique identifier transmitted by the HID tag when the consumer is nearby POS computer 200. According to the embodiments, HID reader is disposed at the POS and can read the HID tag during completion of the transaction.

According to embodiments, when a consumer makes a transaction, for example approaching a cash register to tender payment for goods or service, an HID reader queries the consumer's HID tag and captures the consumer's unique identifier from the HID tag. According to embodiments, a PIN may be required to verify the identity of the consumer.

In some cases, multiple HID tags from multiple consumers will be in range of unique identifier reader 210 (HID reader). In these cases, [HID RESOLUTION] the merchant may ask the consumer for physical HID device so the merchant can disambiguate the multiple captured unique identifiers by reference to HID device, according to embodiments.

According to alternate embodiments of disambiguating multiple captured unique identifiers, the merchant will be able to input into POS computer 200 features that disambiguate the consumers. For example, if a couple, both having an HID device, approaches unique identifier reader 210, POS computer will send both unique identifiers to server 100 with a disambiguation request. Server 100 will query database 1010, which will return demographic information related to both unique identifiers. The returned demographic data which will then be transmitted to POS computer 200. POS computer 200, for example, will present the merchant with an option of selecting whether the male or female is conducting the transaction. Depending on the selection made by the merchant, the unique identifier of the actual consumer making the transaction will be disambiguated.

According to still other embodiments, the consumer will enter a unique PIN into POS computer 200 via an input device. All of the HID's captured during the transaction will then be submitted as part of the total transaction data to server 100. When the total transaction data reaches server 100, the PIN will be used to select the correct HID for the transaction and the other captured unique identifiers will be discarded.

According to embodiments, unique identifier reader 210 is a credit card machine. Accordingly, the consumer's credit card number comprises the unique identifier. The credit card machine reads the credit card of the consumer, which is transmitted to server 100 as part of the total transaction data set and used as the primary or a secondary unique identifier.

According to embodiments, consumers have multiple unique identifiers. For example, a consumer has a plurality of credit cards, a driver's license, a cellular telephone number, and email address, and an HID FOB. Each of these unique identifiers can be used to uniquely identify the consumer. For example, the consumer's HID tag is read at the time he approaches a cash register by unique identifier reader 210, which is an HID reader in this case. Thereafter, the consumer might provide a credit card to tender payment to the merchant. Both the unique identifier transmitted by the HID tag and the credit card number, name on the credit card, or expiration date are transmitted as part of the total transaction data, set to server 100, according to embodiments, and the credit card number, credit card name, expiration data or combinations thereof might be used to disambiguate multiple captured HID unique identifiers included in the total transaction data set. Moreover, if a consumer forgets a primary form of tendering a unique identifier for example an HID card, the consumer will be able to use an alternate unique identifier at the POS, such as a credit card number, telephone number, or arbitrary unique identifier.

According to embodiments, point of sale capture device 20 is a stand alone device and peripheral used in conjunction with an analog cash register. Accordingly, point of sale capture device 20 may comprise a credit card reader as described above further comprising both unique 210 identifier reader and POS computer 200, or could comprise an input device that allows the consumer to manually input a unique identifier. Such an input device is any computer input device that allows a user to input an alphanumeric string, for example a keyboard, mouse, touchpad, or touch screen, according to embodiments.

According to embodiments, POS capture device 20 is a specialized cash register that is configured to capture a unique identifier of a consumer via HID or via another method of identification as disclosed herein and automatically transmits the total transaction data to server 100. Accordingly, the cash register's processor and other hardware comprise point of sale computer 200. The register's input and RFID reader device comprises unique identifier reader 210, according to embodiments. According to other embodiments, the cash register is configured to receive signals from ancillary hardware comprising unique identifier reader 210. In this case, the register is POS computer 200.

According to another example, POS computer 200 is a stand alone device that is intended to be used with paper forms of conducting transactions, for example for mobile cash stations or transactions traditionally done with paper sales slips such as the purchase of an automobile or real estate. Accordingly, POS computer 200 captures a unique identifier via unique identifier reader 210 which could be a built-in or ancillary HID reader or input device, as described above. According to embodiments, POS computer 200 stores the unique identifier and outputs to the merchant a unique transaction number to be recorded with a paper record of the transaction. Thereafter, the merchant either scans the paper record or manually inputs transaction details contained with the paper record. At that time, the merchant would also enter the unique transaction number, whereby the transaction data is coupled to the captured unique identifier of the consumer.

According to other embodiments, the entire transaction is conducted manually. The merchant records a unique identifier manually from the consumer, e.g., a driver's license number or a credit card number, as well as the transaction data. The merchant then inputs the unique identifier and transaction data into POS computer 200.

According to embodiments, POS capture device 20 further comprises virtual printer 220. Virtual printer 220 prints a virtual copy of a receipt recording details of the transaction between the merchant and the consumer. According to embodiments, virtual printer 220 is a portable document format (pdf) printer, image printer, word processor document printer, or other printer that prints a receipt to an electronic file that is stored locally to POS computer's 200 local disk, solid state storage, or RAM, for example. According to embodiments, the text embedded in the electronic file output from virtual printer 220 is recognized via optical character recognition algorithms (OCR) or plain text. According to embodiments, recognition is enhanced by providing the OCR algorithm with a template mask that directs the OCR algorithm where in the virtual receipt to seek specific pieces of information. For example, the algorithm might "look" to the top right of the receipt to locate the date. For each data field recognized, POS computer 200 stores the data in local storage for later association with the consumer's unique identifier to form a total transaction data set and subsequent transmission to server 10. According to embodiments, virtual printer 220 is used in conjunction with printer 230 for printing both a virtual copy of a receipt and a paper copy of the receipt that can be given to the consumer as proof of the transaction.

Rather than using an image of the transaction receipt via a virtual printer and OCR to recognize and capture the details of the transaction, POS computer 200 stores and transmits raw transaction data, according to embodiments. For example, if a consumer purchases a package of gum, an SKU is scanned by an optical scanner connected to POS computer 200. Once POS computer 200 recognizes the product SKU, certain data is accessed via a database, for example, the name of the package of gum, the price of the package of gum, etc. Similarly, other data is likewise gathered, for example the date and time of the transaction, the merchant or merchant's agent that conducted the transaction, the physical location where the transaction occurred, and other data that might be relevant with respect to a given transaction. According to embodiments, these specific pieces of data are stored in a database or in an extensible mark up language (XML) file. Rather than outputting this data via a virtual receipt, POS computer 200 gathers the data and stores it locally until it is ready to be transmitted to server 100 with the consumer's unique identifier. Where raw transaction data is captured, according to embodiments, an actual paper copy of the receipt is also output and deliverable to the consumer as proof of the transaction.

According to embodiments, POS capture device 20 also comprises printer 230 for printing paper receipts. Printer 230 is connected to POS computer 200 via standard connections, e.g., serial connection (RS232), universal serial bus (USB) connection, network connection via IEEE 801.02 wired standard or IEEE 802.11 wireless standard, Bluetooth (IEEE 802.15.1), or via proprietary connection methods. Printer 230 is any standard receipt printer, according to embodiments.

According to embodiments, after transaction data and the consumer's unique identifier are captured, they are associated together to form the total transaction data set. According to embodiments, association occurs at the time the transaction occurs. For example, at the conclusion of the transaction, the transaction data and the unique identifier of the consumer are combined into the total transaction data set. The total transaction data set is stored in a database or as an XML file, according to embodiments. In both cases, association of the transaction data with the unique identifier is accomplished by simply adding the unique identifier to a database table or appending it to an XML file with the appropriate tags. The receipt given to the consumer as proof of the transaction includes the total transaction data, according to embodiments. Thus, the consumer is able to verify that he is correctly identified as the consumer. According to other embodiments, the combination of unique identifier and transaction data occurs shortly after the transaction is concluded. Generally, combination of the unique identifier and transaction data is effective around the time of the transaction and prior to subsequent transactions occurring.

According to embodiments and as illustrated in FIG. 7, POS capture device 20 communicates with remote server 10 bi-directionally. POS capture device 20 transmits total transaction data, comprising both transaction data, an associated unique identifier of the consumer involved in the transaction, and a merchant identifier to remote server 10. According to embodiments the connection between remote server 10 and POS capture device 20 is an internet connection using common internet protocols (e.g. http, ftp, or others known to artisans), proprietary communications protocols, or occurs via telephone connection. According to embodiments, communications can be encrypted or unencrypted.

According to embodiments, remote server 10 comprises at least server 100 and database 1010. According to embodiments, server 100 comprises at least a web server service, for example an Apache web server or Internet Information Services (IIS) web server. Server 100 facilitates remote communication with point of sale capture device 20 via the web server, according to embodiments. Artisans will readily understand that remote server 10 may comprise a server farm or a plurality of interconnected servers located geographically independently for redundancy of data, bandwidth, or speed purposes, for example.

According to embodiments, server 100 also communicates with database 1010. According to embodiments, server 100 will support server side scripting, of any kind, for example PHP: hypertext preprocessor (PHP), for access of the data to be written to or contained in database 1010 and also for dynamically presenting data as part of webpages to a consumer or merchant via consumer/merchant computer 30.

According to embodiments database 1010 is implemented as part of server 1010. Database is the central hub for all the data to be collected, stored, and processed. It is also a location from where data is retrieved. Database 1010 is an organizational tool for organizing and storing data gathered at the point of sale. Database 1010 may be implemented as a SQL database, MYSQL database, Cassandra, or Oracle database, or a proprietary database, for example. Use of other commercially available or specially implemented databases are expressly contemplated. According to other embodiments, database 1010 is developed specifically for organizing and storing data generated from transactions. Generally, database 1010 must be able to store and retrieve large volumes of data and provide access to the data.

According to embodiments and as illustrated in FIG. 7, the consumer/merchant can use computer 300 having an internet connection to communicate with server 100. Using internet connected computer 300, merchant/consumer can access a variety of data related to completed transaction.

Software Modules

Figure 8:
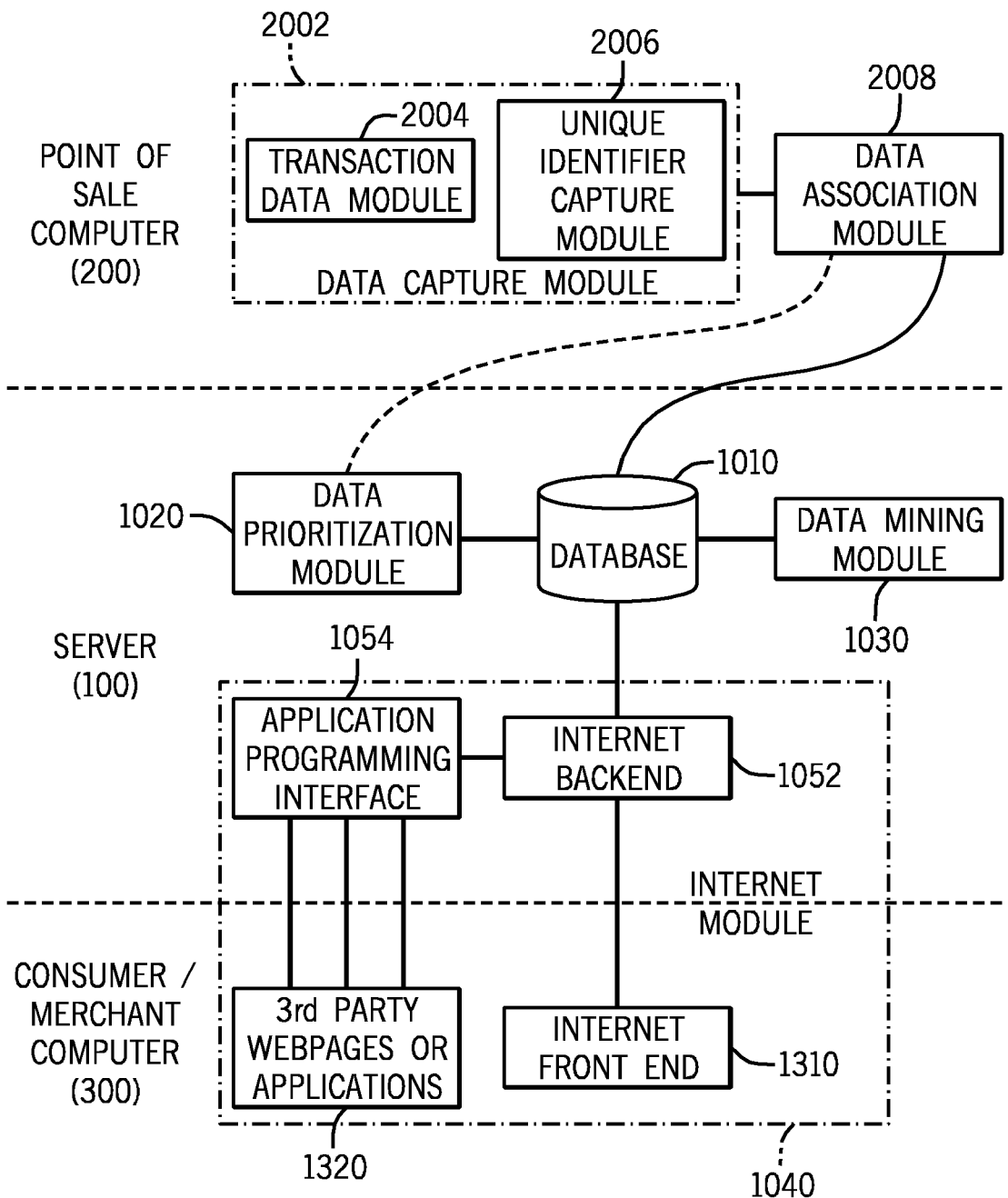
FIG. 8 is a block diagram of an embodiment of the various modules used in transaction data capture devices and systems.

According to embodiments, FIG. 8 illustrates various software modules comprising points and data capture system 1. According to the exemplary illustration, the various components of data capture system are executed on point of sale capture device 20, on remote server 10, and on consumer/merchant computer 300. According to embodiments, each of these components are connected via the internet (e.g., via http, ftp, or other well known or proprietary communications protocols). According to embodiments, communications can be encrypted or unencrypted.

As illustrated according to exemplary embodiments, POS computer 200 comprises data capture module 2002 and data association module 2008. Data capture module 2002 comprises, according to embodiments, transaction data module 2004 and unique identifier module 2006. Transaction data module 2004 captures the details of a transaction. For example, at the start of a transaction, transaction data module 2004 records the date of the transaction and the time of the transaction in a local memory involved or XML file. Transaction data module 2004 also records an identifier of the merchant's agent, the transaction, as well as a unique merchant identifier. As the transaction proceeds, transaction data module 2004 further records each good or service purchased, the quantity of each good or service purchased, and the price of each good or service. Towards the conclusion of the transaction, data transaction module 2004 records the total amount tendered, the tax due, and the method of payment. According to the exemplary embodiments, data transaction module 2004 also records the credit card number of the consumer, if a credit card was tendered for payment as a primary or secondary unique identifier of the consumer. In this sense transaction data module 2004 captures data that is also applicable to data captured by unique identifier module 2006. Indeed, in actual practice, transaction data module 2004 and unique identifier module 2006 are the same software. However, they can be separate software as well, particularly in embodiments where POS computer 200 and unique identifier reader 210 are distinct hardware, each running software of their own.

According to embodiments, data capture module 2002 also comprises software for running various hardware components used in the transaction. Such hardware components comprise, for example, bar code scanners, input devices such as numeric key pads or cash register keyboards, credit card machines, merchant or consumer displays for showing the prices of goods or services being purchased, etc. Data capture module 2002, according to embodiments, communicates with a merchant maintained database to look up prices for each bar code scanned. According to other embodiments, transaction data module 2004 accomplishes these tasks. As explained above, the modular organization presented in FIG. 8 is intended to illustrate functions needed to practice data capture system; the organization is therefore intended to be exemplary and instructional rather than limiting.

According to embodiments where virtual printer 220 is used to capture transaction data, transaction data module 2004 is responsible for OCR of the document. After OCR is complete, transaction data module 2004 parses the data. Accordingly, data is recognized and categorized. For example, transaction data module may have a mask to interpret the contents of an OCRed virtual receipt. The mask will tell transaction data module 2004 where to look for the date, the register used for the transaction, etc. According to other embodiments, data transaction module 2004 parses the text and recognizes it based on preprogrammed parsing conventions (e.g., how the virtual receipt formats the date, time, prices, product identification, etc). Each of these data are stored locally temporarily (e.g. via database on XML file) until processed by data association module 2008.

According to embodiments, unique identifier capture module 2006 captures or interacts with hardware that captures the consumer's unique identifier and records it locally. For example, unique identifier capture module 2006 comprises software that interacts with or drives unique identifier reader 210. For example, where unique identifier reader 210 is an HID reader, unique identifier capture module 2006 interacts with the HID reader and records input to the HID reader. Moreover, according to embodiments, unique identifier capture module 2008 disambiguates multiple or inconsistent unique identifier as described above. Data captured by unique identifier capture module 2008 is stored in the same or different database or XML file as the transaction data.

According to embodiments, data association module 2008 combines the transaction data and the unique identifier and forms the total transaction data set. The total transaction data set comprises the data captured by transaction data module 2004, and the one or more unique identifiers captured during the course of the transaction. According to embodiments, data association module also "packages" the total transaction data into a form that is readable by server 100. For example, data association module takes transaction data parsed by transaction data module and formats it in appropriate fields into a specially server-formatted document that is transmitted to server 100 for data entry into database 1010.

Once the total transaction data set is captured, it is transmitted to server 100. According to embodiments, server comprises database 1010 and internet connection module 1040. As illustrated in the exemplary embodiment of FIG. 8, server also comprises data prioritization module 1020 or data mining module 1030.

Implementations of database 1010 are described above.

According to embodiments, data prioritization module 1020 prioritizes requests for server communications and processing bandwidth, for example. According to embodiments, transaction speed at the POS is highest priority for server 100 requests. Thus, POS computer 200 is given priority over other non-critical server processes or database access requests to expedite transactions at the POS. Thus, when using consumer/merchant computer 300, greater lag will be experienced in obtaining access to database 1010 than when using POS computer 200. Similarly, overhead processes such as indexing and data mining are lower priority as well. According to embodiments, and as illustrated by the dashed line connecting data association module 2008 and data prioritization module 1020, data is routed first through data prioritization module 1020 prior to reaching database as the top priority data communication.

According to embodiments, data mining module 1030 comprises a process that aggregates and indexes data contained in database 1010 for more rapid retrieval. Data mining module performs analysis of data within database 1010. For example, data mining module 1030 comprises a recommendations engine for recommending products or services to consumers or product placement or advertising channels for merchants, according to embodiments. According to other embodiments, data mining module 1030 analyzes data contained in database 1010 for trends. In essence, data mining module 1030 optimizes database content for viewing via consumer/merchant computer 300 or for transmission to point of sale computer 200. Data mining is a low priority process, according to embodiments.

Internet connection module 1040 resides on server 100 and comprises internet back-end 1052 and internet front-end 1310. Internet front-end 1310 is illustrated as being part of consumer/merchant computer 300 to better visualize where each module is "experienced." However, artisans will readily appreciate that internet front-end 1310 is actually hosted on server 100 and consumer/merchant computer 300 downloads a document such as a hypertext markup language (HTML) document from server 100, where it is hosted, to consumer/merchant computer 3000 where it is displayed by a web browser. Proprietary display software is contemplated as well, in which case the document or raw data is transmitted via XML or other known or proprietary communications protocols.

According to embodiments, internet back-end 1052 is the bridge between the internet front-end 1310 and database 1010. According to embodiments, internet back-end 1052 comprises tools used to query database 1010 and outputs results to internet front-end 1310 for viewing by the consumer or merchant. Internet back-end comprises, according to embodiments, a plurality of scripts (e.g., PHP langauge scripts) executable via internet front-end 1310 or automatically.

According to embodiments, internet front-end 1310 provides a user-friendly interface for interacting with server 100, and more specifically the data in database 1010. Internet front-end 1310 comprises, according to embodiments, one or more webpages designed as an interface to view data in database 1010. For example, a consumer would use internet front-end 1310 to login to her account and view a history of her most recent transactions, look at her spending trends, or look at the balance of her rewards points with a given merchant. According to another example, a merchant uses internet front-end 1310 to login to his account and view transaction details, from the performance of the sales of one product, to the most productive salesperson, to the demographics purchasing a product, to the relative success of an advertising campaign, and so forth. Internet front-end 1310 formats webpages containing the data and allows the consumer or merchant to view the webpages in a browser. Internet front-end 1310 also provides the interface for the consumer to manage her account and input demographic information, as well as print coupons or otherwise interact with points and data capture system 1. Likewise, internet front-end 1310 provides the same basic account level functionality to merchant, including account management, analytical tools, etc.

According to embodiments, application programming interface 1054 (API) allows for the development and implementation of usable features in third party webpages or applications 1320 that require access to data in database 1010 via internet back-end 1052. According to embodiments, API comprises a vocabulary and calling conventions for access to database 1010 via internet back-end 1054. The vocabulary and calling convention comprises at least one of protocols, objects, routines, data structures, etc. that enable a third party webpage or application developer to access data from database 1010 via internet back-end 1054.

Data Capture Procedure

According to embodiments and as illustrated in FIG. 9, a method for combining a consumer's demographic information with transaction data is described. As illustrated, transaction data is captured during a transaction between a consumer and a merchant in operation 5010. At some point before, during, or after the transaction is completed, at least one unique identifier of the consumer is captured as described herein in operation 5020. The unique identifier data and transaction data are associated together to form a total transaction data set in operation 5030, which is recorded in database 1010 in operation 5040. In operation 5050, additional demographics are associated with the total transaction data set from the demographic information provided by the consumer. Operation 5050 is optional, according to embodiments, as an optimization to enhance efficiency in implementations of points and data capture system 1 that provides demographic information to consumers or merchants for transactions. After the demographics are or are not, according to the particular implementation, associated in embodiments that associate the consumer's demographics with the total transaction data set, or after the total transaction data set is recorded in database 1010 for other embodiments, data from the database is provided to merchants or consumers in operation 5060.

Point of Sale Processing Procedure

According to embodiments, a method of managing consumer accounts and applying points and rewards is disclosed. According to embodiments, the method includes interactions between consumer 5, merchant 4, POS capture device 20, and remote server 10, for example as illustrated in FIG. 10.

According to embodiments, during a transaction between consumer 5 and merchant 4, POS capture device 20 receives at least one unique identifier. According to embodiments, a merchant identifier is stored with POS capture device 20 or separately input or captured. POS capture device 20 transmits at least the unique identifier to remote server 10.

According to embodiments, the points and data capture system 1 accesses database 1010 via server 100 containing the consumer account associated with the unique identifier. The account database may determine a feature of the consumer account, including accrued points, rewards, and rebates available based on the consumer account. The account management system may return to the POS device a feature of the consumer account, such as the number of points or available rewards for viewing.

According to embodiments, POS capture device 20 submits to the points and data capture system 1 the total transaction data marked as "pending." Points and data capture system 1 may apply features of the consumer account to the items to be purchased and return an updated list of the points (based on the pending items being purchased) or any flags for any POS action(s) (e.g., reward redemptions, 15% off, etc.). Such a response may be a rewards possibility available to the consumer.

According to embodiments, if the consumer chooses to act on a redemption possibility, POS capture device 20 causes points and data capture system 1 to deduct points from the consumer account. Such points may be general or specific to the number of points allocated to a given merchant. For example, where points were used to receive a rebate or redemption, points and data capture system 1 would deduct points accordingly. Payment is then settled between consumer 5 and merchant 4.

According to embodiments, a transaction may result in the accrual of points or rewards to a consumer account. According to embodiments, points and data capture system 1 allocates points to that account based on at least one of the value of transaction and the merchant's preferences or a points campaign (e.g., X number of points per Y amount spent; X number of points per Y number of qualifying items purchased, etc.).

According to embodiments, upon completion of a transaction, points and data captures system 1 flags the items purchased as "purchased," rather than as "pending." According to embodiments, this change occurs when the total transaction data set is transmitted from POS capture device 20 to remote server 10 and the data is processed into database 1010.

According to embodiments, points and data capture system 1 manages adjustments to points or other account parameters. For example, in the event that too many or too few points were awarded, a consumer or a merchant may interact with a points and data capture system 1 to make the proper adjustments via consumer/merchant computer 300 and internet connection module 1040 or via POS capture device 20. Where a consumer wishes to return an item, the purchase of which resulted in a change in the account of the consumer or the merchant, the consumer or the merchant make adjustments to the relative point balances to reverse the change in the account upon return of the item. Other customizable modifications to at least one account by any one of the consumer, the merchant, or points and data capture system 1 are contemplated in the present disclosure.

According to embodiments, the devices, systems, or methods disclosed herein are operational in an information technology infrastructure or with numerous other general purpose or special purpose computing system environments or configurations. Examples of well known computing systems, environments, or configurations that may be suitable for use with the subject matter of this disclosure include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, or the like.

According to embodiments, the devices, systems, or methods disclosed herein are described in the general context of computer-executable instructions, such as program modules, being executed by a computer. Generally, program modules include, for example, routines, programs, objects, components, and data structures, which perform particular tasks or implement particular abstract data types. The devices, systems, or methods disclosed herein may also be practiced in distributed computing environments where tasks are performed by remote processing devices that are linked through a communications network. In a distributed computing environment, program modules may be located in both local and remote computer storage media including memory storage devices. The computer programs are stored in a memory medium or storage medium or they may be provided to a processing unit through a network or I/O bus.

According to embodiments, the devices, systems, or methods disclosed herein include at least one central processing unit (CPU) or processor. According to embodiments, the CPU is coupled to a memory, ROM, or computer readable media containing the computer-executable instructions for implementing a database or the systems disclosed herein, as well as performing the methods disclosed herein. The machine readable media may store instructions or data which implement all or part of the system or methods described herein. According to embodiments, machine readable media is any available media that can be accessed by the devices or systems disclosed herein, or by computers generally, and includes both volatile and nonvolatile media, removable and non-removable media implemented in any method or technology for storage of information such as computer readable instructions, data structures, program modules, or other data. Computer storage media includes, but is not limited to: random access memory; read-only memory; EEPROM; flash memory; portable memory or other memory technology; CD-ROM, digital versatile disks (DVD), or other optical disk storage; magnetic cassettes, magnetic tape, magnetic disk storage, or other magnetic storage devices; or any other medium which can be used to store the desired information and which can be accessed by the data capture system disclosed herein.

Communication media typically embodies computer readable instructions, data structures, program modules, or other data in a modulated data signal such as a carrier wave or other transport mechanism and includes any information delivery media. By way of example, and not limitation, communication media includes wired media such as a wired network or direct-wired connection, and wireless media such as acoustic, radio frequency, infrared, or other wireless media. Combinations of any of the above should also be included within the scope of communications media.

EXAMPLES

Example 1

Use of Data Capture System in Manufacturer Product Distribution Management Including Warranty Registration According to embodiments, points and data capture system 1 is provides an effective platform for handling warrantees from the merchant or manufacturers to the consumers. For example, warranties for durable goods such as refrigerators, lawn mowers, etc can automatically be administered through use of points and data capture system 1.

According to embodiments, the manufacturer would require that its distributors or merchants install and use points and data capture system 1, which would enable the manufacturer to gather real time information regarding when an item they manufacture is sold. It would also help the manufacturer better manage their supply chain. For example, ACME sells large quantities of lawn and garden equipment to ABC Hardware. ACME continues to produce equipment based on what it expects the market to sell. If, for example, ABC sells mainly walk behind mowers, but ACME has anticipated sales of small garden tractors, ACME would be over producing the small garden tractors. However, if ACME required ABC to utilize points and data capture system 1 at the point of sale, ACME could shift what is ordering from its suppliers and its build schedule to meet the market requirements in real time.

Moreover, by knowing exactly who has purchased the equipment, there would be no need for the consumer to fill out warranty information. Rather, warrant information could be transmitted to the manufacturer immediately. This information could be shared with ABC as well to establish a better relationship with the consumer. Product recalls could be done better as well as overall warranty handling.

Example 2

Use of Data Capture System with Companies with Multiple Chains

Companies with multiple chains, especially independent chains, could employ the points and data capture system 1. Using points and data capture system 1 in conjunction with each cash register would allow for better management of inventory and sales tracking. Companies would also generate real time data regarding the success of their marketing strategies.

Example 3

Use of Data Capture System in Hotels

According to embodiments, points and data capture system 1 can be used in hotels. For example, guests could be issued a card with an HID tag, such as an RFID tag, that would be linked to the points and data capture system 1. The guest could go from place to place within the hotel and be offered services, seamlessly confirming changes in real time. No keys or signatures would be required in the hotel at any point where a unique identifier reader could capture the guests HID. Management could also track these movements and re-allocate man-power and other resources immediately to areas having the most need.

While the apparatus and method have been described in terms of what are presently considered to be practical and effective embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. A method comprising:
receiving from a merchant via a point of sale (POS) capture device a total transaction data set for a transaction;
receiving a consumer's unique identifier and a merchant identifier from the POS capture device as part of a total transaction data set; and
adjusting a points balance for the merchant in the consumer's account hosted on a remote server based on the transaction data;
wherein the consumer's account aggregates points for a plurality of disparate merchants, the points balance for at least one merchant being exclusive from the points balance of at least one other merchant, wherein each merchant account is private from other merchant's accounts and wherein a merchant cannot view exchange of good or service details gathered by any other merchant;

wherein the method is capable of sharing the consumer's identity with the merchant, wherein said sharing requires the consumer's expressed consent to have said identity shared with the merchant, and wherein the method is also capable of keeping consumer's identity confidential from the merchant, and wherein each consumer account includes a consumer demographics module that solicits the consumer's demographics, the demographics module allowing the merchant to create and run various queries related to sales of particular goods or services, and evaluate the demographics of purchasing trends of those who are buying or not buying those goods or services, wherein remote server access is prioritized such that the POS capture device receives highest priority to the remote server.

2. The method of claim 1, further comprising if the consumer's account has a sufficient point balance prior to the completion of the transaction, offering the consumer a reward.

3. The method of claim 1, further comprising deducting a quantity of points from the consumer's account for the merchant if the reward is accepted by the consumer.

4. The method of claim 1, wherein the balance of points for the merchant in the consumer's account is adjustable if details of the transaction are adjusted after the transaction is concluded.

5. The method of claim 1, further comprising receiving from the merchant a parameters related to a points campaign, wherein the points campaign defines at least the total number of points to be awarded in the campaign, the conditions required to receive points, and the duration of the campaign.

6. The method of claim 1, wherein the customer's unique identifier is transmitted from a human interface device (HID), wherein the unique identifier is comprised by a credit card number and is read by a credit card machine, and wherein the HID enables merchants to keep track of their customer base and implement loyalty programs.

7. A system comprising, in combination:
a point-of-sale (POS) capture device comprising at least:
a unique identifier reader configured to receive a unique identifier;
a display configured for providing information to at least one of a merchant and a consumer; and
a POS computer; and
a remote server comprising
a database containing information regarding at least one consumer account and transaction data for a plurality of transactions; and
a server for facilitating communication between the POS capture device and the remote server;
wherein the remote server comprises a plurality of consumer accounts, wherein at least one consumer account comprises a points balance for a plurality of disparate merchants, the points balance for at least one merchant being exclusive from the points balance of at least one other merchant,
wherein each merchant account is private from other merchant's accounts and wherein a merchant cannot view exchange of good or service details gathered by any other merchant;
wherein the system is capable of sharing the consumer's identity with the merchant, wherein said sharing requires the consumer's expressed consent to have said identity shared with the merchant, and wherein the system is also capable of keeping consumer's identity confidential from the merchant, and
wherein each consumer account includes a consumer demographics module that solicits the consumer's demographics, the demographics module allowing the merchant to create and run various queries related to sales of particular goods or services, and evaluate the demographics of purchasing trends of those who are buying or not buying those goods or services, and
wherein remote server access is prioritized such that the POS capture device receives the highest access priority to the remote server.

8. The system of claim 7, wherein the server for facilitating communication comprises a webserver, the webserver being adapted to also facilitate communication between the remote server and a consumer/merchant computer.

9. The system of claim 8, wherein a consumer or a merchant can retrieve data stored in the database from the consumer/merchant computer via the webserver.

10. The system of claim 9, wherein a merchant can create a points campaign from the consumer/merchant computer, the points campaign defines at least the total number of points to be awarded in the campaign, the conditions required to receive points, and the duration of the campaign.

11. The system of claim 7, wherein the server for facilitating communication between the POS capture device and the remote server communicates bidirectionally.

12. The system of claim 11, wherein prior to the end of a transaction, the server communicates to the POS capture device one or more rewards opportunities for the consumer to consider in exchange for points.

13. The system of claim 7, wherein the unique identifier reader is an RFID reader that reads an RFID tag carried by the consumer.

14. A machine-readable medium containing instructions stored thereon for, with a remote server:
receiving from a merchant via a point of sale (POS) capture device a total transaction data set for a transaction;
receiving a consumer's unique identifier and a merchant identifier from the POS capture device as part of a total transaction data set;
adjusting a points balance for the merchant in the consumer's account hosted on the remote server based on the transaction data;
wherein the consumer's account aggregates points for a plurality of disparate merchants, the points balance for at least one merchant being exclusive from the points balance of at least one other merchant,
wherein each merchant account is private from other merchant's accounts and wherein a merchant cannot view exchange of good or service details gathered by any other merchant;
wherein the server is capable of sharing the consumer's identity with the merchant, wherein said sharing requires the consumer's expressed consent to have said identity shared with the merchant, and wherein the server is also capable of keeping consumer's identity confidential from the merchant, and
wherein each consumer account includes a consumer demographics module that solicits the consumer's demographics, the demographics module allowing the merchant to create and run various queries related to sales of particular goods or services, and evaluate the demographics of purchasing trends of those who are buying or not buying those goods or services.

15. The machine-readable medium of claim 14, further comprising if the consumer's account has a sufficient point balance prior to the completion of the transaction, offering the consumer a reward.

16. The machine-readable medium of claim 15, further comprising deducting a quantity of points from the consumer's account for the merchant if the reward is accepted by the consumer.

17. The machine-readable medium of claim 14, wherein the balance of points for the merchant in the consumer's account is adjustable if details of the transaction are adjusted after the transaction is concluded.

18. The machine-readable medium of claim 14, further comprising receiving from the merchant a parameters related to a points campaign, wherein the points campaign defines at least the total number of points to be awarded in the campaign, the conditions required to receive points, and the duration of the campaign.

19. The machine-readable medium of claim 14, further comprising a data prioritization module for prioritizing access to the remote server.

* * * * *